United States Patent
Furuse et al.

(10) Patent No.: US 11,840,121 B2
(45) Date of Patent: Dec. 12, 2023

(54) SUSPENSION

(71) Applicant: SUBARU CORPORATION, Tokyo (JP)

(72) Inventors: Tomohiro Furuse, Tokyo (JP); Koichi Uchikawa, Tokyo (JP); Ryuma Mine, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/974,723

(22) Filed: Oct. 27, 2022

(65) Prior Publication Data

US 2023/0150324 A1    May 18, 2023

(30) Foreign Application Priority Data

Nov. 17, 2021   (JP) ................................ 2021-187146

(51) Int. Cl.
  *B60G 3/20*  (2006.01)
  *B60G 3/26*  (2006.01)

(52) U.S. Cl.
  CPC ............ *B60G 3/26* (2013.01); *B60G 2200/18* (2013.01); *B60G 2200/46* (2013.01); *B60G 2200/462* (2013.01); *B60G 2400/64* (2013.01)

(58) Field of Classification Search
  CPC ........ B60G 2200/1442; B60G 2400/64; B60G 3/26; B60G 2200/182; B60G 2200/18
  See application file for complete search history.

(56) References Cited

U.S. PATENT DOCUMENTS

| | | | |
|---|---|---|---|
| 5,507,510 A * | 4/1996 | Kami ...................... | B60G 3/26 280/124.136 |
| 9,434,230 B2 * | 9/2016 | Schmitt ................. | B60G 11/50 |
| 10,406,880 B2 * | 9/2019 | Mizumoto .............. | B60G 3/20 |
| 10,800,224 B2 * | 10/2020 | Sellars .................. | B60G 3/225 |
| 2015/0367705 A1 * | 12/2015 | Schmitt ................. | B60G 11/50 280/124.106 |
| 2016/0347137 A1 * | 12/2016 | Despres-Nadeau .... | B60G 3/202 |
| 2018/0086165 A1 * | 3/2018 | Mizumoto .............. | B60G 3/20 |

(Continued)

FOREIGN PATENT DOCUMENTS

| | | | | |
|---|---|---|---|---|
| DE | 4408571 A1 * | 9/1994 | .............. | B60G 3/26 |
| DE | 102008044103 A1 * | 6/2010 | .............. | B60G 3/20 |

(Continued)

*Primary Examiner* — Paul N Dickson
*Assistant Examiner* — Maxwell L Meshaka
(74) *Attorney, Agent, or Firm* — MCGINN I.P. LAW GROUP, PLLC

(57) ABSTRACT

A suspension includes a housing, a radius arm, a radius arm bush, and a shock absorber. Inclination angles $\theta 1$ and $\theta 2$ satisfy $\Delta F \cdot \tan \theta 2 > M \cdot \tan \theta 1$, in which: $\theta 1$ is an inclination angle at which a straight line coupling the center of the radius arm bush to the center of a rear wheel is inclined to a horizontal line, to lower toward the rear wheel, viewed from a side of the vehicle in a steady state; $\theta 2$ is an inclination angle at which an axis of expansion and shrink of the shock absorber is inclined to a vertical direction, to allow the shock absorber's upper end to more forward from the shock absorber's lower end; M is an unsprung mass of the suspension; and $\Delta F$ is an amount of increase in a vertical load on the rear wheel from the steady state during a shrinkwise stroke of the shock absorber.

20 Claims, 3 Drawing Sheets

(56) References Cited

U.S. PATENT DOCUMENTS

2019/0299737 A1* 10/2019 Sellars .................. B60G 3/225
2022/0227191 A1* 7/2022 Dong .................. B62D 21/183

FOREIGN PATENT DOCUMENTS

| DE | 102018213286 A1 * | 2/2020 |
| JP | H01-119404 A | 5/1989 |
| JP | H05229324 A * | 9/1992 |
| JP | H05229325 A * | 9/1992 |
| JP | H08-192613 A | 7/1996 |

* cited by examiner

SUSPENSION

CROSS-REFERENCE TO RELATED APPLICATIONS

The present application claims priority from Japanese Patent Application No. 2021-187146 filed on Nov. 17, 2021, the entire contents of which are hereby incorporated by reference.

BACKGROUND

The disclosure relates to a suspension for a vehicle such as an automobile.

Vehicles such as automobiles are provided with suspensions. A suspension includes a hub bearing housing and suspension links. In the following, the hub bearing housing is simply referred to as a housing. The housing rotatably supports a wheel. The housing is strokably coupled to a vehicle body by the suspension links.

An end of the suspension link, i.e., a node, is swingably coupled to the housing or the vehicle body, with an elastic member such as a cylindrical rubber bush in between.

As an existing technique related to a suspension, Japanese Unexamined Patent Application Publication (JP-A) No. H1-119404 describes a multi-link suspension in which lateral links couple a rotary support of a rear wheel to a vehicle body, with elastic bushes in between. The lateral links are installed in front of and behind the rotary support. Rigidity of the elastic bush of the rear lateral link is set to be higher than rigidity of the elastic bush of the front lateral link. This causes a toe change by compliance steering when cornering.

JP-A No. H8-192613 describes a toe control mechanism of a parallel-link suspension. The parallel-link suspension includes a front link and a rear link, with a wheel axle of a tire interposed therebetween. In the toe control mechanism, the same bushes are interposed at nodes between the links and a body, or at nodes between the links and side on which a knuckle is disposed. The bushes are press-fitted in respective fitting holes. Allowing the fitting holes to have different internal diameters makes it possible to allow the front and rear bushes to have different elasticity when installed, and thereby make a toe control.

SUMMARY

An aspect of the disclosure provides a suspension including a housing, a radius arm, a radius arm bush, and a shock absorber. To the housing, a hub bearing is attached. The hub bearing rotatably supports a rear wheel of a vehicle. The radius arm is unitized with the housing and protrudes from the housing toward front of the vehicle. The radius arm bush is provided on a front end of the radius arm. The radius arm bush couples the radius arm to a vehicle body of the vehicle, with an elastic body in between. The shock absorber is configured to generate a damping force in response to vertical motion of the housing with respect to the vehicle body. An inclination angle θ1 and an inclination angle θ2 are set to satisfy $$\Delta F \cdot \tan \theta 2 > M \cdot \tan \theta 1$$

in which θ1 is an inclination angle at which a straight line coupling the center of the radius arm bush to the center of the rear wheel is inclined to a horizontal line, to lower toward the rear wheel, in a steady state of the vehicle, θ2 is an inclination angle at which an axis of expansion and shrink of the shock absorber is inclined to a vertical direction, to allow an upper end of the shock absorber to more forward from a lower end of the shock absorber, M is an unsprung mass of the suspension, and ΔF is an amount of increase in a vertical load on the rear wheel from the steady state during a shrinkwise stroke of the shock absorber.

An aspect of the disclosure provides a suspension including a housing, a radius arm, a radius arm bush, a shock absorber, a front lateral link, a rear lateral link, a front outer bush, a front inner bush, a rear outer bush, and a rear inner bush. To the housing, a hub bearing is attached. The hub bearing rotatably supports a rear wheel of a vehicle. The radius arm is unitized with the housing and protrudes from the housing toward front of the vehicle. The radius arm bush is provided on a front end of the radius arm. The radius arm bush couples the radius arm to a vehicle body of the vehicle, with an elastic body in between. The shock absorber is configured to generate a damping force in response to vertical motion of the housing with respect to the vehicle body. The front lateral link includes both ends spaced in a vehicle widthwise direction. The front lateral link couples the housing to the vehicle body and is disposed forwardly of the center of the rear wheel. The rear lateral link includes both ends spaced in the vehicle widthwise direction. The rear lateral link couples the housing to the vehicle body and is disposed rearwardly of the center of the rear wheel. The front outer bush couples the front lateral link to the housing, with an elastic body in between. The front inner bush couples the front lateral link to the vehicle body, with an elastic body in between. The rear outer bush couples the rear lateral link to the housing, with an elastic body in between. The rear inner bush couples the rear lateral link to the vehicle body, with an elastic body in between. (Kf×Lf)/(Kr×Lr) falls within a range of 0.9 to 1, both inclusive, in which Kf=Kfout+Kfin, and Kr=Krout+Krin in which Kfout is rigidity of the front outer bush, Kfin is rigidity of the front inner bush, Krout is rigidity of the rear outer bush, Krin is rigidity of the rear inner bush, Lf is a distance along a vehicle longitudinal direction from the center of the front outer bush to the center of the rear wheel, and Lr is a distance along the vehicle longitudinal direction from the center of the rear outer bush to the center of the rear wheel.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
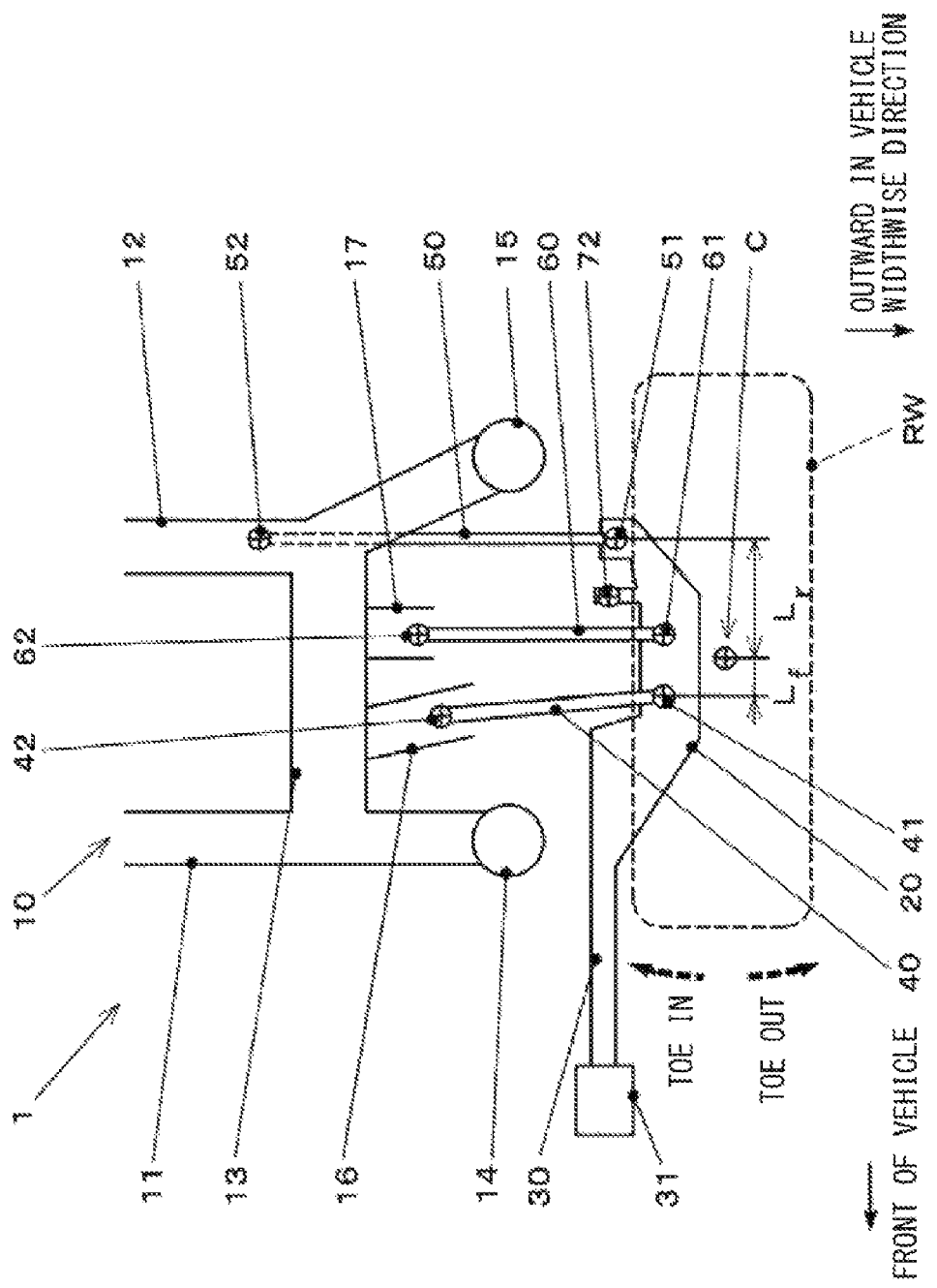
FIG. 1 is a schematic plan view of a suspension according to an embodiment of the disclosure, as viewed from above.

Researches have been made to enhance operation stability by means of characteristics or arrangement of components of a suspension. Most of such researches have focused on a steady state after settlement of a response to a steering operation at an initial stage of cornering.

However, in terms of evaluation of controllability when a driver actually drives a vehicle, it is significant to notice a steering response in a transient response state before the steady state.

Let us focus on behavior of a rear suspension at a start of cornering. First, the behavior of the rear suspension is influenced by vertical force steering, i.e., a toe change corresponding to variations in a vertical load on a tire. In this region, a shock absorber sticks because of friction, and does not make any stroke.

Depending on suspension geometry, a rear wheel may sometimes exhibit the following behavior. First, the rear wheel is steered in a toe-out direction, by the vertical force steering on the occasion of an increase in the vertical load on the tire. Thereafter, the rear wheel is reversed in a toe-in direction, by roll steering, i.e., a toe change in accordance with a suspension stroke.

As described, there is a time delay in a response, between the start of cornering and the time when the toe change in the toe-in direction occurs in the rear wheel on outer side of the cornering. A long time delay in the response may cause lowered controllability of the vehicle.

It is desirable to provide a suspension that makes it possible to enhance responsiveness at an initial stage of cornering.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

A suspension according to one embodiment of the disclosure may be, for example, a rear suspension that supports a rear wheel of an automobile such as a passenger car.

FIG. 1 is a schematic plan view of the suspension of the embodiment, as viewed from above.

Figure 2:
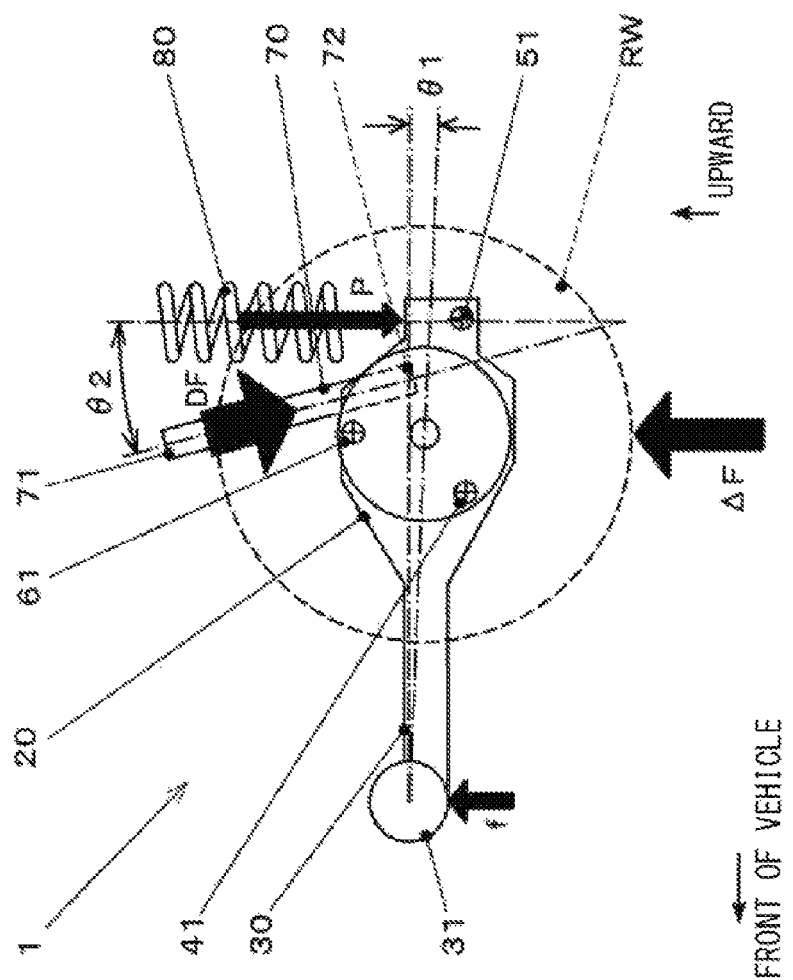
FIG. 2 is a schematic side view of the suspension according to the embodiment, as viewed from a side of a vehicle.

FIG. 2 is a schematic side view of the suspension of the embodiment, as viewed from a side of a vehicle.

The suspension 1 supports a rear wheel RW. The suspension 1 may include, for example, a rear subframe 10, a housing 20, a radius arm 30, a front lateral link 40, a rear lateral link 50, an upper link 60, a shock absorber 70, and a spring 80.

The rear subframe 10 is attached to an underside of a rear part of an unillustrated vehicle body. The rear subframe 10 is a member that serves as a base of the suspension 1.

The rear subframe 10 may include, for example, a front member 11, a rear member 12, a side member 13, a front bush 14, a rear bush 15, a front lateral link bracket 16, and an upper link bracket 17.

In the specification and the claims, rigidity of a bush provided in each lateral link means rigidity with respect to an input in a vehicle widthwise direction, unless otherwise specified. The center of each bush means the center of rigidity, i.e., the rigidity center.

The front member 11 is a beam-shaped member provided in a front part of the rear subframe 10 and extended in the vehicle widthwise direction.

The rear member 12 is a beam-shaped member provided in a rear part of the rear subframe 10 and extended in the vehicle widthwise direction.

The front member 11 and the rear member 12 are spaced apart from each other in a longitudinal direction.

On both ends of the front member 11 and the rear member 12 in the vehicle widthwise direction, cylindrical portions are provided. In the cylindrical portions, the front bush 14 and the rear bush 15 are press-fitted.

The side member 13 is a beam-shaped member extended in the vehicle longitudinal direction. The side member 13 couples a rear portion of a vehicle-widthwise middle part of the front member 11 to a front portion of a vehicle-widthwise middle part of the rear member 12.

The side member 13 is provided in a pair, in spaced relation to each other in the vehicle widthwise direction. In FIG. 1, one of the side members 13 is illustrated.

The front member 11, the rear member 12, and the side member 13 include, for example, panels of press-molded steel plates assembled and welded together. Thus, the front member 11, the rear member 12, and the side member 13 have a closed cross-section as taken on a plane orthogonal to the longitudinal direction.

The front bush 14 and the rear bush 15 are members that couple the rear subframe 10 to the unillustrated vehicle body, with an elastic body such as rubber in between. The elastic body has an anti-vibration effect.

The front bush 14 is provided on both ends of the front member 11 in the vehicle widthwise direction.

The rear bush 15 is provided on both ends of the rear member 12 in the vehicle widthwise direction.

The front bush 14 and the rear bush 15 may each include, for example, a cylindrical rubber bush. The cylindrical rubber bush is disposed with its central axis aligned with the vertical direction.

The front bush 14 and the rear bush 15 may each include, for example, an inner cylinder and an outer cylinder disposed in a concentric double-tube shape, with rubber filling space therebetween. The rubber is vulcanization-bonded to between the inner cylinder and the outer cylinder.

The outer cylinders of the front bush 14 and the rear bush 15 are press-fitted into the cylindrical portions on both ends of the front member 11 and the rear member 12.

The inner cylinders of the front bush 14 and the rear bush 15 are fastened to the vehicle body, by mechanical fastening, e.g., with the use of bolts.

The front lateral link bracket 16 is a base to which a front inner bush 42 of the front lateral link 40 is attached.

The front lateral link bracket 16 protrudes vehicle-widthwise outwardly from an underside of a longitudinally middle part of the side member 13.

The upper link bracket 17 is a base to which an upper inner bush 62 of the upper link 60 is attached.

The upper link bracket 17 protrudes vehicle-widthwise outwardly from an upside of the longitudinally middle part of the side member 13.

Strictly, the rear subframe 10 exhibits a minute displacement with respect to the vehicle body because of elastic deformation of the front bush 14 and the rear bush 15.

However, in the specification and the claims, the rear subframe 10 is considered as a part of the vehicle body, i.e., a bracket where components such as links of the suspension 1 are attached to the vehicle body.

The housing 20 is a member that houses and holds an unillustrated hub bearing. The hub bearing rotatably supports an unillustrated hub to which the rear wheel RW is fastened.

The housing 20 is strokably supported in a direction in which the rear wheel RW moves vertically with respect to the vehicle body, by the radius arm 30, the front lateral link 40, the rear lateral link 50, and the upper link 60 described below.

The radius arm 30 is an arm-shaped member unitized with the housing 20. The radius arm 30 protrudes from a front part of the housing 20 toward front of the vehicle.

On a front end of the radius arm 30, a radius arm bush 31 is provided.

The radius arm bush 31 may include, for example, an elastic bush such as a cylindrical rubber bush having the central axis aligned with the vehicle widthwise direction.

The radius arm bush 31 includes an outer cylinder and an inner cylinder. The outer cylinder of the radius arm bush 31 is fixed to the front end of the radius arm 30. The inner cylinder of the radius arm bush 31 is fastened to the unillustrated vehicle body at a position forward of a front edge of the rear wheel RW.

The radius arm 30 and the housing 20 are swingable with respect to the vehicle body about the central axis of the radius arm bush 31.

As illustrated in FIG. 2, in a steady state of the vehicle, or a so-called 1G state, the center of the radius arm bush 31 is disposed at a higher position than the center C of the rear wheel RW.

As viewed in the vehicle widthwise direction, a straight line coupling the center of the radius arm bush 31 to the center C of the rear wheel RW is inclined to the horizontal line by an angle θ1, to lower backwardly.

An upward load f acts on the radius arm bush 31 in the steady state of the vehicle.

The front lateral link 40 is a link, or a suspension arm, extended in the vehicle widthwise direction between an underside of the front part of the housing 20 and the front lateral link bracket 16 of the rear subframe 10.

In the specification and the claims, the term "extended in the vehicle widthwise direction" is not limited to a case where a longitudinal direction of each link strictly coincides with the vehicle widthwise direction, but includes a case where the longitudinal direction of each link is inclined to the vehicle widthwise direction.

The front lateral link 40 is disposed, with both ends spaced apart in the vehicle widthwise direction.

An end of the front lateral link 40 on side on which the housing 20 is disposed is swingably coupled to the underside of the front part of the housing 20, with a front outer bush 41 in between.

An end of the front lateral link 40 on side on which the rear subframe 10 is disposed is swingably coupled to the front lateral link bracket 16, with the front inner bush 42 in between.

The front lateral link 40 is disposed forwardly of the center C of the rear wheel RW.

The rear lateral link 50 is a link extended in the vehicle widthwise direction between an underside of a rear part of the housing 20 and an unillustrated bracket provided in an underside of the rear member 12 of the rear subframe 10.

The rear lateral link 50 is disposed, with both ends spaced apart in the vehicle widthwise direction.

An end of the rear lateral link 50 on the side on which the housing 20 is disposed is swingably coupled to the underside of the rear part of the housing 20, with a rear outer bush 51 in between.

An end of the rear lateral link 50 on the side on which the rear subframe 10 is disposed is swingably coupled to the underside of the rear member 12, with a rear inner bush 52 in between.

The rear lateral link 50 is disposed rearwardly of the center C of the rear wheel RW.

The front lateral link 40 and the rear lateral link 50 are configured to perform, for example, positioning of a toe angle of the rear wheel RW.

The rear lateral link 50 is lengthened with respect to the front lateral link 40. This imparts a roll steering characteristic to the suspension 1. The roll steering characteristic means that the rear wheel RW is steered in a toe-in direction during a bumpwise stroke of the suspension 1, or a shrinkwise stroke.

The upper link 60 is a link extended in the vehicle widthwise direction between an upside of the housing 20 and the upper link bracket 17 of the rear subframe 10.

The upper link 60 is disposed, with both ends spaced apart in the vehicle widthwise direction.

An end of the upper link 60 on the side on which the housing 20 is disposed is swingably coupled to the upside of the housing 20, with an upper outer bush 61 in between.

An end of the upper link 60 on the side on which the rear subframe 10 is disposed is swingably coupled to the upper link bracket 17, with the upper inner bush 62 in between.

The upper link 60 is disposed at a position in the vehicle longitudinal direction upward of the center C of the rear wheel RW.

The upper link 60 is configured to perform, for example, positioning of a camber angle of the rear wheel RW in cooperation with the front lateral link 40 and the rear lateral link 50.

Each of the outer bushes and the inner bushes described above may include, for example, an elastic bush such as a cylindrical rubber bush having a central axis aligned with the vehicle longitudinal direction.

For example, each of the outer bushes and the inner bushes may include an outer cylinder and an inner cylinder, with an elastic material such as rubber filing space therebetween. The elastic material such as rubber is vulcanization-bonded to between an inner circumferential surface of the outer cylinder and an outer circumferential surface of the inner cylinder. The outer cylinder is press-fitted into a cylindrical portion provided in each link. The inner cylinder is fastened to the rear subframe 10 or the housing 20.

The shock absorber 70 is a damping element configured to generate a damping force during a stroke of the suspension 1. The damping force increases in accordance with an increase in a stroke speed, i.e., an expansion or shrink speed.

The shock absorber 70 may include, for example, a hydraulic shock absorber including an orifice through which hydraulic oil passes during a stroke.

An upper end 71 of the shock absorber 70 is attached to, for example, the vehicle body, with an anti-vibration rubber mount in between.

A lower end 72 of the shock absorber 70 is swingably coupled to, for example, the housing 20, with an elastic bush such as a cylindrical rubber bush in between.

The lower end 72 of the shock absorber 70 is disposed at a position in the vehicle longitudinal direction rearward of the center C of the rear wheel RW and forward of the rear outer bush 51 of the rear lateral link 50.

From the lower end 72 of the shock absorber 70 to the housing 20, a force DF generated by the shock absorber 70 acts downward along a central axis of the shock absorber 70. The force DF is a composite force of a frictional force and the damping force. The central axis of the shock absorber 70 is a line of axis of expansion and shrink of the shock absorber 70.

As illustrated in FIG. 2, in a case with the vehicle in the steady state, as viewed in the vehicle widthwise direction, a direction of the line of axis of expansion and shrink of the shock absorber 70 is forwardly inclined to the vertical direction by an angle θ2, to allow the upper end 71 to more forward from the lower end 72.

The spring 80 is a spring element configured to generate a reaction force corresponding to an amount of stroke of the suspension 1.

The spring 80 may include, for example, a compression coil spring.

The spring 80 is disposed rearwardly of the shock absorber 70, with a line of axis of expansion and shrink aligned with the vertical direction. The line of axis of expansion and shrink of the spring 80 is the center of coil winding.

An upper end and a lower end of the spring 80 abut on unillustrated spring sheets provided respectively on the vehicle body and on the rear lateral link 50.

A downward load P acts from the spring 80 on the spring sheet on side on which the rear lateral link 50 is provided.

At a start of cornering of the vehicle, first, a steering angle is generated on a front wheel by, for example, a steering operation by a driver who drives the vehicle. Thereupon, a slip angle is given to a front wheel tire, and the front wheel tire generates a lateral force, i.e., a cornering force, corresponding to the slip angle.

The cornering force acting on the front wheel causes yaw behavior of the vehicle body, or rotation about a vertical axis. A part of the force generated by the front wheel is transmitted to the suspension 1 on side on which the rear wheel RW is disposed, while involving torsion of the vehicle body.

Immediately after the start of the cornering of the vehicle, the suspension 1 on the side on which the rear wheel RW is disposed is in a stuck state in which friction of, for example, the shock absorber 70 inhibits behavior in a direction of stroke.

In this state, an increase in the vertical load on the tire of the rear wheel RW on outer wheel side of the cornering causes a toe change called vertical force steering in the rear wheel RW because of geometric displacement, or geometry, and rigidity balance of the links of the suspension 1.

In a multi-link suspension having a configuration as in this embodiment, generally, the vertical force steering on the occasion of the increase in the vertical load often causes a toe change in a toe-out direction.

Thereafter, as the suspension 1 starts a stroke, because of geometric arrangement of the links, roll steering occurs, causing a toe change in the rear wheel RW in the toe-in direction, in accordance with a rise of the housing 20 with respect to the vehicle body. Thus, a slip angle in the toe-in direction is given to the rear wheel RW, causing generation of a cornering force.

A toe change in a multi-link rear suspension as in this embodiment is considerably influenced by a rigidity ratio of the bushes supporting the front lateral link 40 and the rear lateral link 50.

In particular, longitudinal rigidity of the radius arm bush 31 has to be sufficiently low with respect to rigidity of the bushes supporting the front lateral link 40 and the rear lateral link 50, in consideration of a comfortable ride. Accordingly, rotatory motion of the radius arm 30 about the center C of the rear wheel RW, as viewed from above, is considerably influenced by the rigidity ratio of the bushes supporting the front lateral link 40 and the rear lateral link 50.

For example, let us assume a case where lateral rigidity of the front lateral link 40 is set to be relatively low with respect to lateral rigidity of the rear lateral link 50. In this case, upon receiving a tire lateral force inwardly in the vehicle widthwise direction, e.g., on the outer wheel side of the cornering, the rear wheel RW is displaced, or steered, in the toe-in direction.

Here, $(Kf \times Lf)/(Kr \times Lr)$ is set to fall within a range of 0.9 to 1, both inclusive, in which $Kf=Kfout+Kfin$, and $Kr=Krout+Krin$ in which Kfout is rigidity of the front outer bush 41, Kfin is rigidity of the front inner bush 42, Krout is rigidity of the rear outer bush 51, Krin is rigidity of the rear inner bush 52, Lf is a distance along the vehicle longitudinal direction from the elastic center of the front outer bush 41 to the center C of the rear wheel RW, and Lr is a distance along the vehicle longitudinal direction from the elastic center of the rear outer bush 51 to the center C of the rear wheel RW.

Moreover, as illustrated in FIG. 2, in the steady state of the vehicle, the inclination angle θ1 is an angle formed by a straight line (typically, a horizontal line) extended parallel to a road surface from the rigidity center of the radius arm bush 31, and the straight line coupling the rigidity center of the radius arm bush 31 to the center C of the rear wheel RW. In other words, the inclination angle θ1 is a lower dihedral angle of the radius arm 30. The inclination angle θ2 is an angle formed by the central axis of the shock absorber 70 and a vertical line. In other words, the inclination angle θ2 is a forward inclination angle of the shock absorber 70. The central axis of the shock absorber 70 is the line of axis of expansion and shrink of the shock absorber 70.

During a dynamic stroke of the suspension 1, a longitudinal force $M \cdot \tan \theta 1$ is generated in the radius arm 30, in which M denotes an unsprung mass of the suspension 1. The unsprung mass of the suspension 1 is a mass of a part that moves vertically with respect to the vehicle body in accompaniment with vertical motion of the housing 20 with respect to the vehicle body.

That is, on the outer wheel side at the initial stage of the cornering, in the stuck state in which the shock absorber 70 has not started yet to expand or shrink, an additional upward load ΔF is inputted to the rear wheel RW, with the presence of the inclination angle θ1. Accordingly, a forward force is generated in the radius arm bush 31.

Such a forward force causes a toe change in the rear wheel RW in the toe-out direction.

Figure 3:
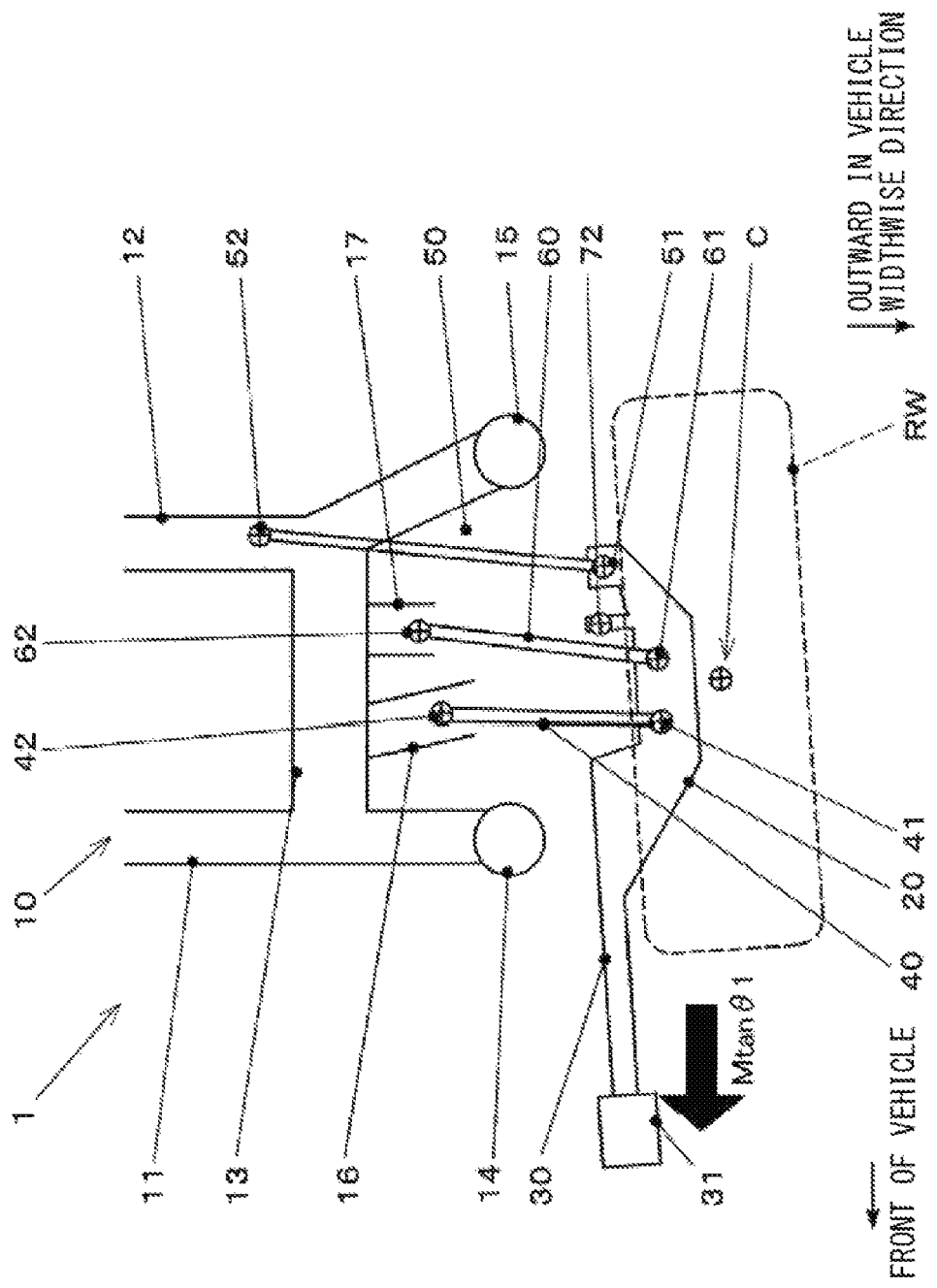
FIG. 3 is a schematic plan view of a multi-link suspension, with a toe change in a toe-out direction.

FIG. 3 is a schematic plan view of a multi-link suspension, with the toe change in the toe-out direction.

The radius arm 30 moves forwardly with respect to the vehicle body in accompaniment with deformation of the radius arm bush 31. Thereupon, the rear lateral link 50 swings around the rear inner bush 52, causing the rear outer bush 51 to be retracted in the vehicle widthwise direction.

Accordingly, the rear wheel RW turns counterclockwise in the example illustrated in FIG. 3 together with the housing 20 and the radius arm 30, and is steered in the toe-out direction.

Thus, in this embodiment, the inclination angle θ2 of the shock absorber 70 is set that satisfies ΔF·tan θ2>M·tan θ1, to allow a component force of the force generated by the shock absorber 70 to overcome the forward load mentioned above. This causes a rearward force in the radius arm 30, leading to suppression of the behavior in which the rear wheel RW is steered in the toe-out direction at the start of the stroke. Hence, it is possible to enhance responsiveness.

As described, according to this embodiment, it is possible to obtain the following effects.

(1) In the case with the increase in the vertical load ΔF in the rear wheel RW on the outer wheel side of the cornering, the force puling the radius arm 30 rearward is generated by a resistance generated by the shock absorber 70 inclined forward. Hence, it is possible to suppress the behavior in which the rear wheel RW makes the toe change in the toe-out direction by the vertical force steering at the start of the stroke of the suspension 1.

This shortens a time delay in a response of the vehicle to a steering operation by the driver, leading to acceleration of a cycle of the operation, the response, and a correction operation between the driver and the vehicle. As a result, it is possible to provide higher accuracy of the operation, and enhance ease of driving of the vehicle.

(2) In the case where the lateral force inward in the vehicle widthwise direction is generated in the tire of the rear wheel RW on the outer wheel side of the cornering at the initial stage of the cornering, it is possible to generate the toe change in the toe-in direction by compliance steering caused by the elastic deformation of each bush, before the suspension 1 starts a stroke to cause the toe change in the toe-in direction by the roll steering. Hence, it is possible to cancel out the toe change in the toe-out direction by the vertical force steering.

As described, according to this embodiment, it is possible to provide a suspension that makes it possible to enhance responsiveness at an initial stage of cornering.

Modification Examples

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

(1) The configurations of the suspension and the vehicle are not limited to the forgoing embodiments, but may be changed as appropriate.

For example, the shapes, the structures, the materials, the manufacturing methods, the arrangements, and the quantities of the members constituting the suspension and the vehicle are not limited to the forgoing embodiments, but may be changed as appropriate.

(2) In the embodiments, the lower end of the shock absorber is coupled to the housing, but the lower end of the shock absorber may be coupled to any one of the suspension links.

(3) In the embodiments, the rear subframe includes, for example, assembled panels of press-molded steel plates, but the rear subframe may be provided by other manufacturing methods.

For example, the rear subframe may be formed by hydroforming. Hydroforming includes applying hydraulic pressure such as water pressure to an inside of a metal hollow body to cause plastic deformation. Alternatively, the rear subframe may include, for example, an extruded member of an aluminum-based alloy.

In another alternative, without the use of the rear subframe, some or all of the suspension links may be coupled to, for example, the vehicle body, or a cross member rigidly coupled to the vehicle body.

(4) In the embodiments, the bushes of each link of the suspension include, for example, cylindrical rubber bushes, but the disclosure is not limited thereto. For example, bushes including an elastic body other than rubber may be used.

Moreover, the bushes of each link of the suspension are not limited to the cylindrical bushes. Other forms of bushes such as a ball joint, or a spherical bearing, may be used.

The invention claimed is:

1. A suspension comprising:
   a housing to which a hub bearing is attached, the hub bearing rotatably supporting a rear wheel of a vehicle;
   a radius arm unitized with the housing and protruding from the housing toward front of the vehicle;
   a radius arm bush disposed on a front end of the radius arm, the radius arm bush coupling the radius arm to a vehicle body of the vehicle, with an elastic body in between; and
   a shock absorber configured to generate a damping force in response to vertical motion of the housing with respect to the vehicle body,
   wherein an inclination angle θ1 and an inclination angle θ2 are set to satisfy the following expression (1)

$$\Delta F \cdot \tan \theta 2 > M \cdot \tan \theta 1 \qquad (1),$$

in which:
   θ1 is an inclination angle at which a straight line coupling a center of the radius arm bush to a center of the rear wheel is inclined to a horizontal line, to lower toward the rear wheel, as viewed from a side of the vehicle in a steady state of the vehicle,
   θ2 is an inclination angle at which an axis of expansion and shrink of the shock absorber is inclined to a vertical direction, to allow an upper end of the shock absorber to more forward from a lower end of the shock absorber,
   M is an unsprung mass of the suspension, and
   ΔF is an amount of increase in a vertical load on the rear wheel from the steady state during a shrinkwise stroke of the shock absorber.

2. The suspension according to claim 1, further comprising:
   a front lateral link including both ends spaced in a vehicle widthwise direction, the front lateral link coupling the housing to the vehicle body and being disposed forwardly of the center of the rear wheel;
   a rear lateral link including both ends spaced in the vehicle widthwise direction, the rear lateral link coupling the housing to the vehicle body and being disposed rearwardly of the center of the rear wheel;
   a front outer bush that couples the front lateral link to the housing, with an elastic body in between;
   a front inner bush that couples the front lateral link to the vehicle body, with an elastic body in between;
   a rear outer bush that couples the rear lateral link to the housing, with an elastic body in between; and
   a rear inner bush that couples the rear lateral link to the vehicle body, with an elastic body in between, wherein (Kf×Lf)/(Kr×Lr) falls within a range of 0.9 to 1, both inclusive,
in which:

$$Kf = Kfout + Kfin, \text{ and}$$

$$Kr = Krout + Krin,$$

in which:
Kfout is rigidity of the front outer bush,
Kfin is rigidity of the front inner bush,
Krout is rigidity of the rear outer bush,
Krin is rigidity of the rear inner bush,
Lf is a distance along a vehicle longitudinal direction from a center of the front outer bush to the center of the rear wheel, and
Lr is a distance along the vehicle longitudinal direction from a center of the rear outer bush to the center of the rear wheel.

3. A suspension comprising:
a housing to which a hub bearing is attached, the hub bearing rotatably supporting a rear wheel of a vehicle;
a radius arm unitized with the housing and protruding from the housing toward front of the vehicle;
a radius arm bush disposed on a front end of the radius arm, the radius arm bush coupling the radius arm to a vehicle body of the vehicle, with an elastic body in between;
a shock absorber configured to generate a damping force in response to vertical motion of the housing with respect to the vehicle body;
a front lateral link including both ends spaced in a vehicle widthwise direction, the front lateral link coupling the housing to the vehicle body and being disposed forwardly of a center of the rear wheel;
a rear lateral link including both ends spaced in the vehicle widthwise direction, the rear lateral link coupling the housing to the vehicle body and being disposed rearwardly of the center of the rear wheel;
a front outer bush that couples the front lateral link to the housing, with an elastic body in between;
a front inner bush that couples the front lateral link to the vehicle body, with an elastic body in between;
a rear outer bush that couples the rear lateral link to the housing, with an elastic body in between; and
a rear inner bush that couples the rear lateral link to the vehicle body, with an elastic body in between,
wherein (Kf×Lf)/(Kr×Lr) falls within a range of 0.9 to 1, both inclusive,
in which:

$$Kf = Kfout + Kfin, \text{ and}$$

$$Kr = Krout + Krin,$$

in which:
Kfout is rigidity of the front outer bush,
Kfin is rigidity of the front inner bush,
Krout is rigidity of the rear outer bush,
Krin is rigidity of the rear inner bush,
Lf is a distance along a vehicle longitudinal direction from a center of the front outer bush to the center of the rear wheel, and
Lr is a distance along the vehicle longitudinal direction from a center of the rear outer bush to the center of the rear wheel.

4. The suspension according to claim 2, wherein, each of the front outer bush, rear outer bush, the front inner bush, and the rear inner bush include an outer cylinder and an inner cylinder, with the elastic material filing space therebetween, and
wherein the elastic material is vulcanization-bonded to between an inner circumferential surface of the outer cylinder and an outer circumferential surface of the inner cylinder.

5. The suspension according to claim 2, wherein the front outer bush, the front inner bush, the rear outer bush, and the rear inner bush are fastened by mechanical fastening to the vehicle body.

6. The suspension according to claim 2, wherein an end of the rear lateral link on a side on which the housing is disposed is swingably coupled to an underside of a rear part of the housing, with the rear outer bush in between.

7. The suspension according to claim 2, wherein an end of the rear lateral link on a side on which a rear subframe is disposed is swingably coupled to an underside of a rear member, with the rear inner bush in between.

8. The suspension according to claim 3, wherein, each of the front outer bush, rear outer bush, the front inner bush, and the rear inner bush include an outer cylinder and an inner cylinder, with the elastic material filing space therebetween, and
wherein the elastic material is vulcanization-bonded to between an inner circumferential surface of the outer cylinder and an outer circumferential surface of the inner cylinder.

9. The suspension according to claim 3, wherein the front outer bush, the front inner bush, the rear outer bush, and the rear inner bush are fastened by mechanical fastening to the vehicle body.

10. The suspension according to claim 3, wherein an end of the rear lateral link on a side on which the housing is disposed is swingably coupled to an underside of a rear part of the housing, with the rear outer bush in between.

11. The suspension according to claim 3, wherein an end of the rear lateral link on a side on which a rear subframe is disposed is swingably coupled to an underside of a rear member, with the rear inner bush in between.

12. The suspension according to claim 1, wherein the inclination angle θ1 and the inclination angle θ2 are set to satisfy the expression (1) to allow a component force of a force generated by the shock absorber to overcome a forward load.

13. The suspension according to claim 1, wherein, in a case with an increase in a vertical load in the rear wheel on an outer wheel side of a cornering, a force puling the radius arm rearward is generated by a resistance generated by the shock absorber inclined forward.

14. The suspension according to claim 1, wherein, in a case where a lateral force inward in the vehicle widthwise direction is generated in the rear wheel on an outer wheel side of a cornering at an initial stage of the cornering, a toe change in a toe-in direction is generated by compliance steering caused by an elastic deformation of each bush, before the suspension starts a stroke to cause the toe change in the toe-in direction by a roll steering.

15. The suspension according to claim 1, wherein the lower end of the shock absorber is coupled to the housing at a position rearward of the center of the rear wheel.

16. The suspension according to claim 15, further comprising a compression coil spring disposed rearwardly of the shock absorber with a line of axis of expansion and shrink aligned with the vertical direction.

17. The suspension according to claim 2, wherein the lower end of the shock absorber is coupled to the housing at a position rearward of the center of the rear wheel and forward of the rear outer bush.

18. The suspension according to claim 17, further comprising a compression coil spring disposed rearwardly of the shock absorber with a line of axis of expansion and shrink aligned with the vertical direction, and wherein a lower end of the compression coil spring is coupled to the rear lateral link.

19. The suspension according to claim 3, wherein the lower end of the shock absorber is coupled to the housing at a position rearward of the center of the rear wheel and forward of the rear outer bush.

20. The suspension according to claim 19, further comprising a compression coil spring disposed rearwardly of the shock absorber with a line of axis of expansion and shrink aligned with the vertical direction, and wherein a lower end of the compression coil spring is coupled to the rear lateral link.

\* \* \* \* \*